US010642426B2

(12) United States Patent
Hwang et al.

(10) Patent No.: US 10,642,426 B2
(45) Date of Patent: *May 5, 2020

(54) TOUCH SCREEN SENSOR

(71) Applicant: LG CHEM, LTD., Seoul (KR)

(72) Inventors: Ji Young Hwang, Daejeon (KR); Han Min Seo, Daejeon (KR); Seung Heon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/777,411

(22) PCT Filed: Dec. 23, 2016

(86) PCT No.: PCT/KR2016/015189
§ 371 (c)(1),
(2) Date: May 18, 2018

(87) PCT Pub. No.: WO2017/111540
PCT Pub. Date: Jun. 29, 2017

(65) Prior Publication Data
US 2018/0329534 A1 Nov. 15, 2018

(30) Foreign Application Priority Data
Dec. 23, 2015 (KR) .................. 10-2015-0185047

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04112* (2013.01)

(58) Field of Classification Search
CPC ......... G06F 2203/04112; G06F 3/0416; G06F 3/044
See application file for complete search history.

(56) References Cited

U.S. PATENT DOCUMENTS

2009/0213091 A1 8/2009 Davidovici et al.
2012/0057312 A1* 3/2012 Yoo .................... G06F 3/041
361/749
2013/0285954 A1* 10/2013 Takahashi ............ G06F 3/0412
345/173
(Continued)

FOREIGN PATENT DOCUMENTS

JP  2014-089585  5/2014
JP  2015-106342  6/2015
(Continued)

Primary Examiner — Temesghen Ghebretinsae
Assistant Examiner — Sosina Abebe
(74) Attorney, Agent, or Firm — Dentons US LLP

(57) ABSTRACT

The present application relates to a touch screen sensor. A touch screen sensor according to an exemplary embodiment of the present application includes a driving electrode unit including a driving electrode pattern (Tx pattern) provided on a first base substrate; and a sensitive electrode unit including a sensitive electrode pattern (Rx pattern) provided on a second base substrate, in which the driving electrode pattern and the sensitive electrode pattern include conductive metal lines and the touch screen sensor includes at least one touch non-sensing area and at least one touch sensing area.

13 Claims, 7 Drawing Sheets

(56) References Cited

U.S. PATENT DOCUMENTS

| | | | |
|---|---|---|---|
| 2014/0152579 A1 | 6/2014 | Frey | |
| 2014/0198269 A1 | 7/2014 | Hwang et al. | |
| 2014/0299361 A1* | 10/2014 | Nakamura | G06F 3/044 |
| | | | 174/253 |
| 2016/0034102 A1* | 2/2016 | Roziere | G06F 3/044 |
| | | | 345/174 |
| 2016/0216793 A1 | 7/2016 | Choi et al. | |
| 2016/0313828 A1 | 10/2016 | Yoshiki | |
| 2016/0364043 A1 | 12/2016 | Hwang et al. | |

FOREIGN PATENT DOCUMENTS

| | | |
|---|---|---|
| JP | 2015-184789 | 10/2015 |
| KR | 10-2015-0035297 | 4/2015 |
| KR | 10-2015-0064561 | 6/2015 |
| KR | 10-2015-0069568 | 6/2015 |
| KR | 10-2015-0097407 | 8/2015 |
| WO | 2015/083410 | 6/2015 |
| WO | 2015107977 | 7/2015 |

\* cited by examiner

[Figure 1]
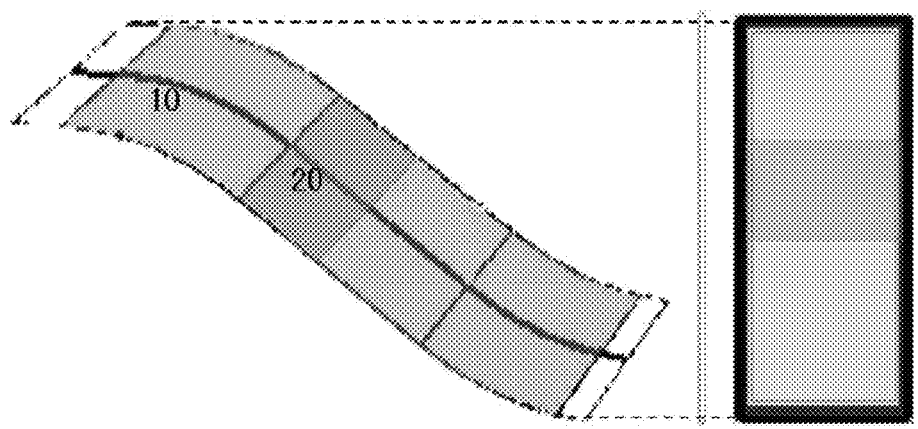
[Figure 2]
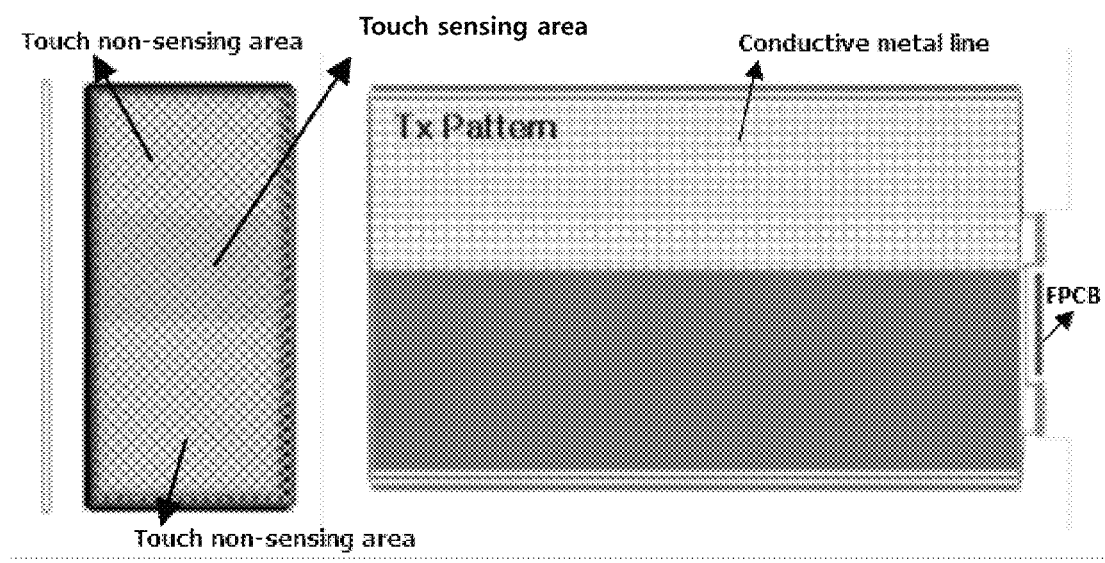

[Figure 3]
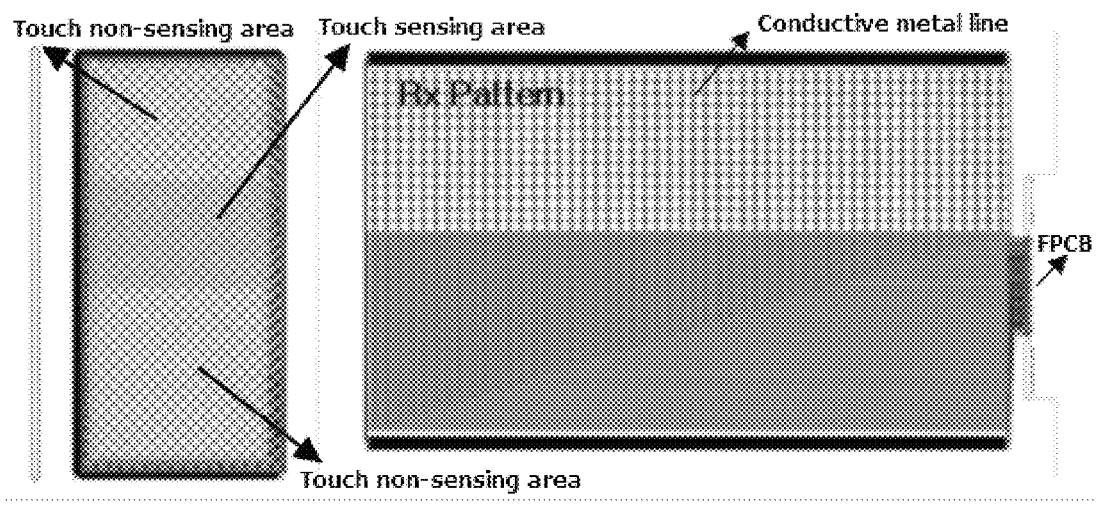
[Figure 4]
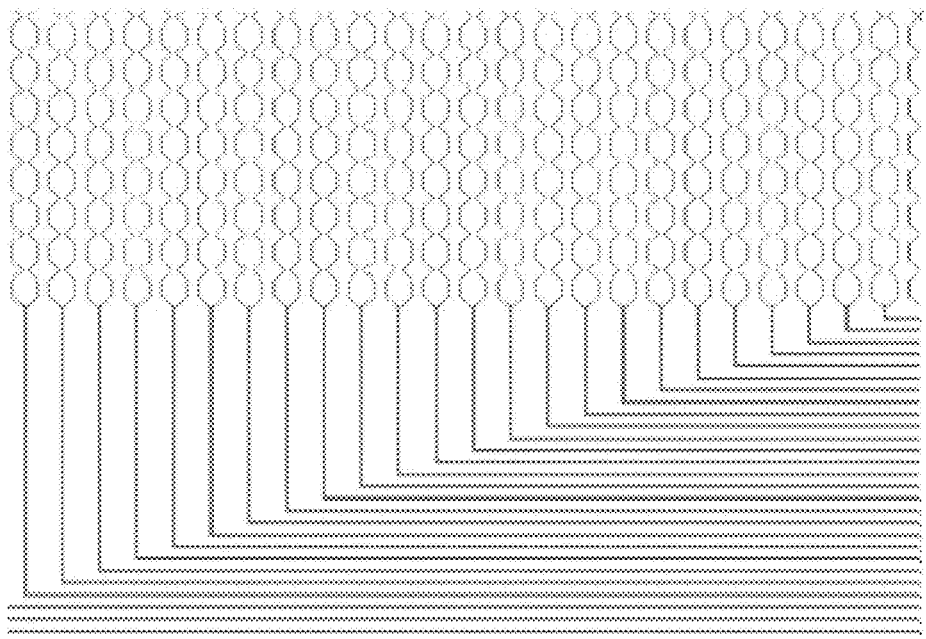

[Figure 5]
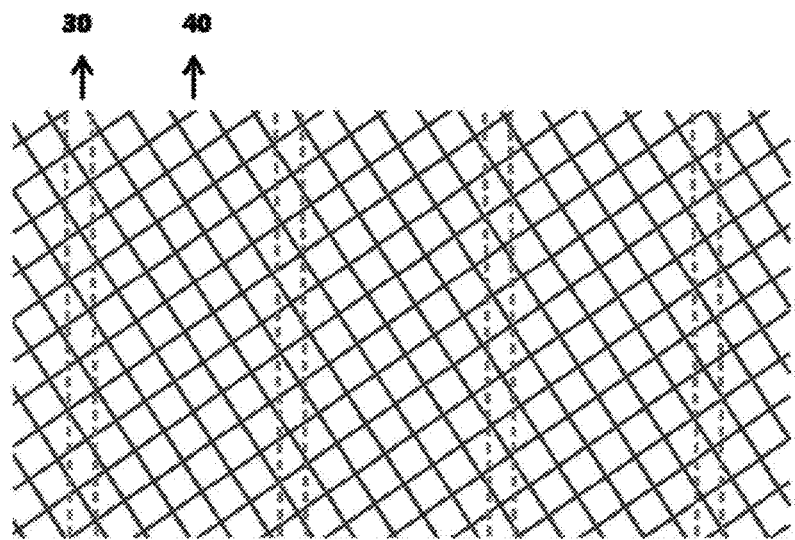
[Figure 6]
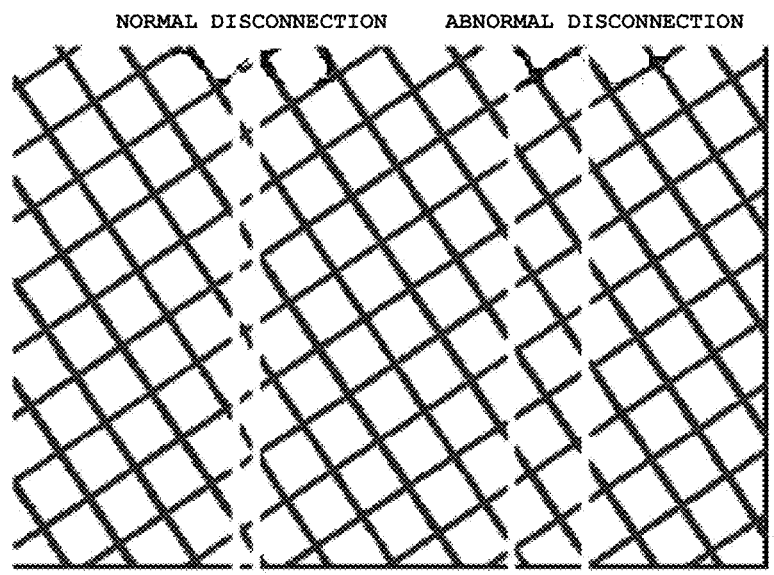

[Figure 7]
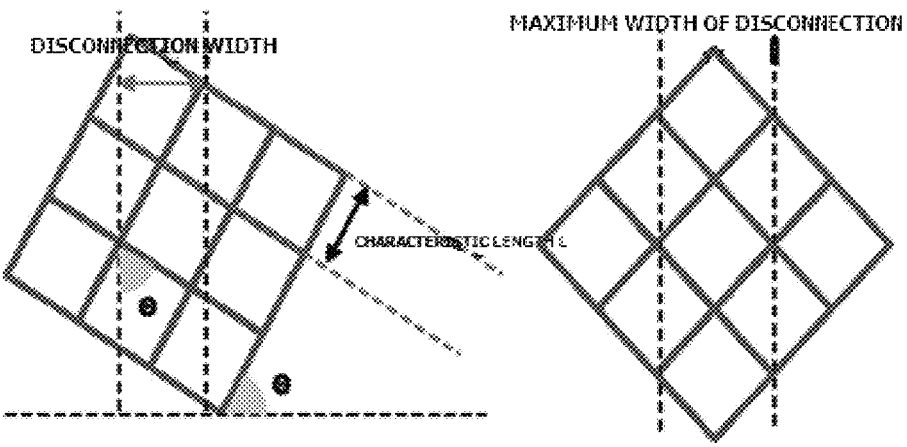
[Figure 8]
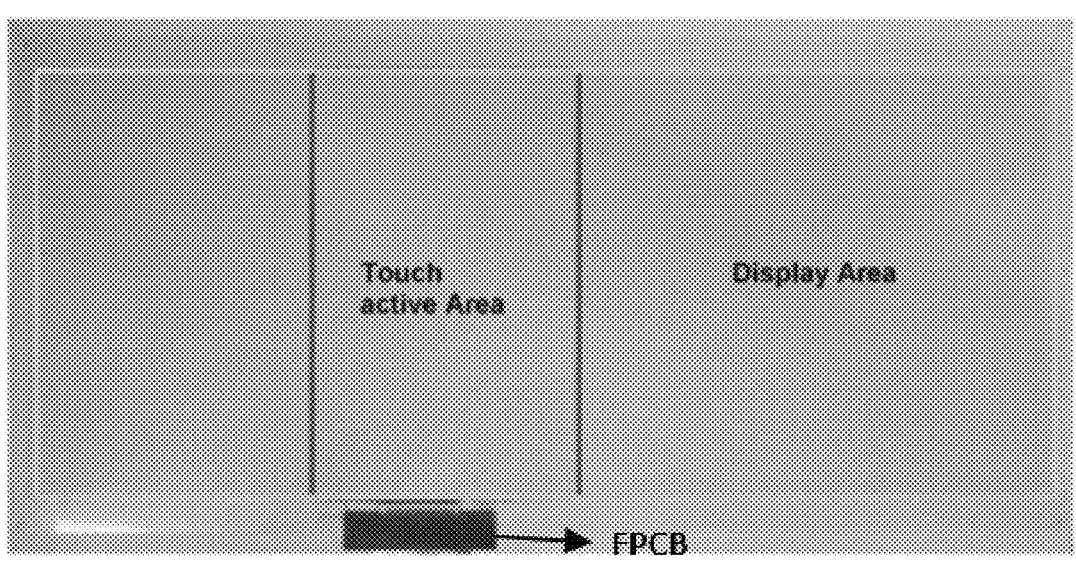

[Figure 9]
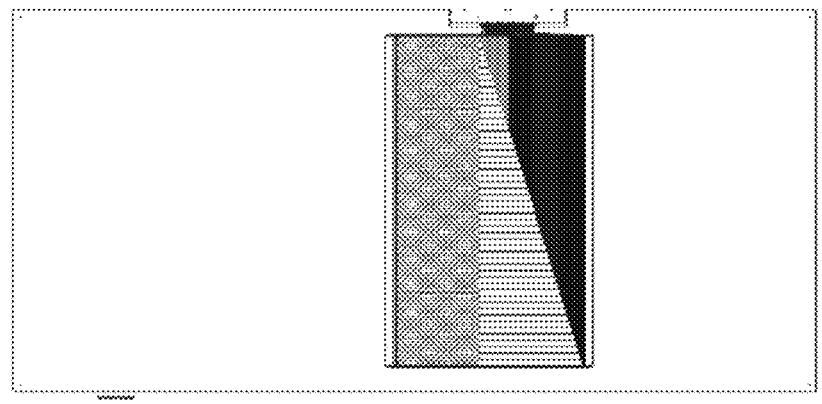
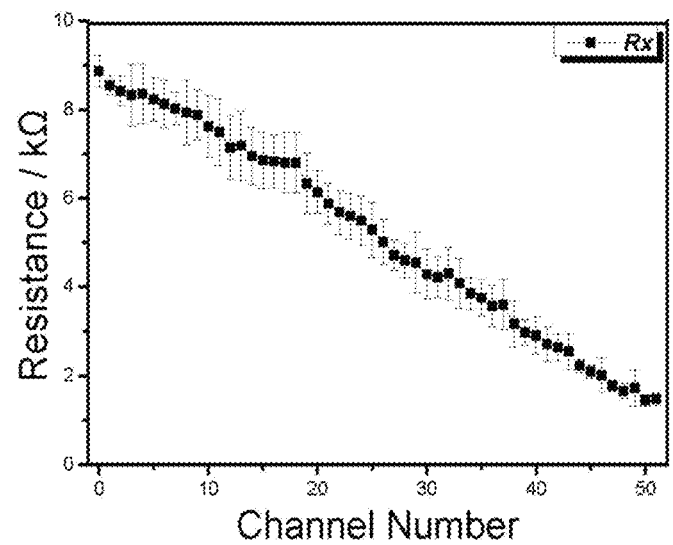

[Figure 10]
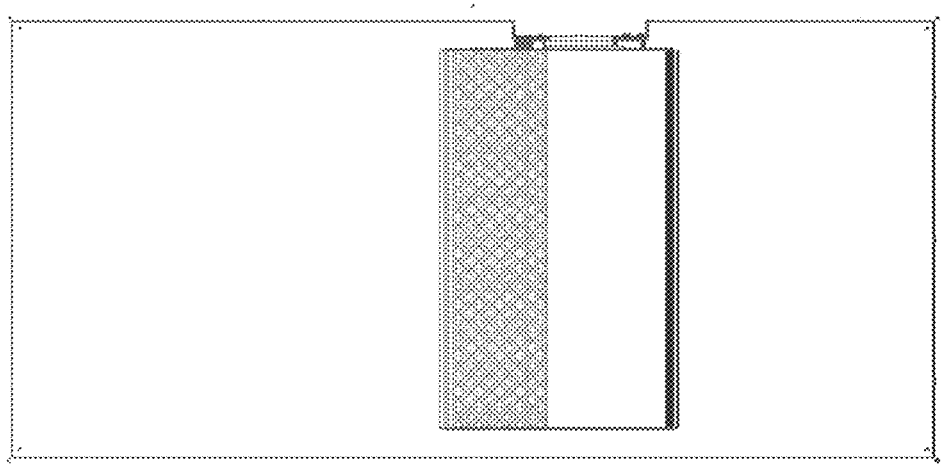
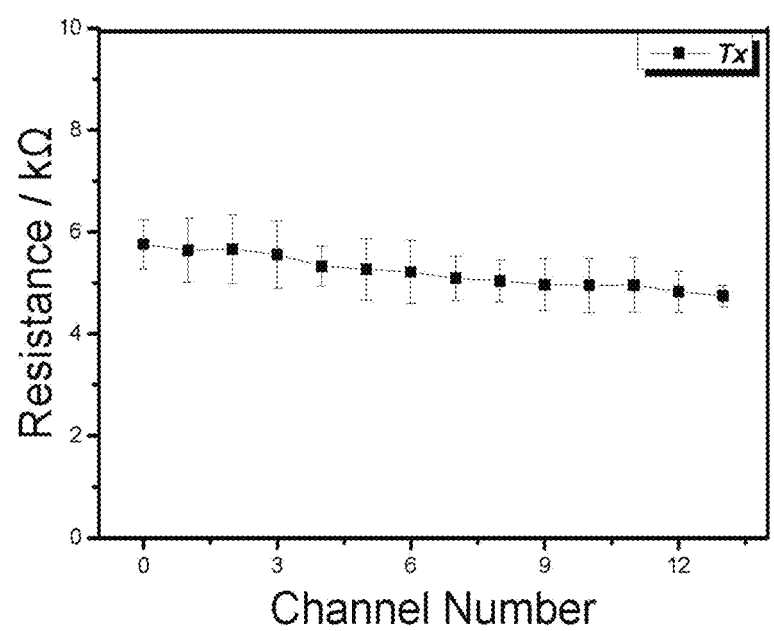

[Figure 11]
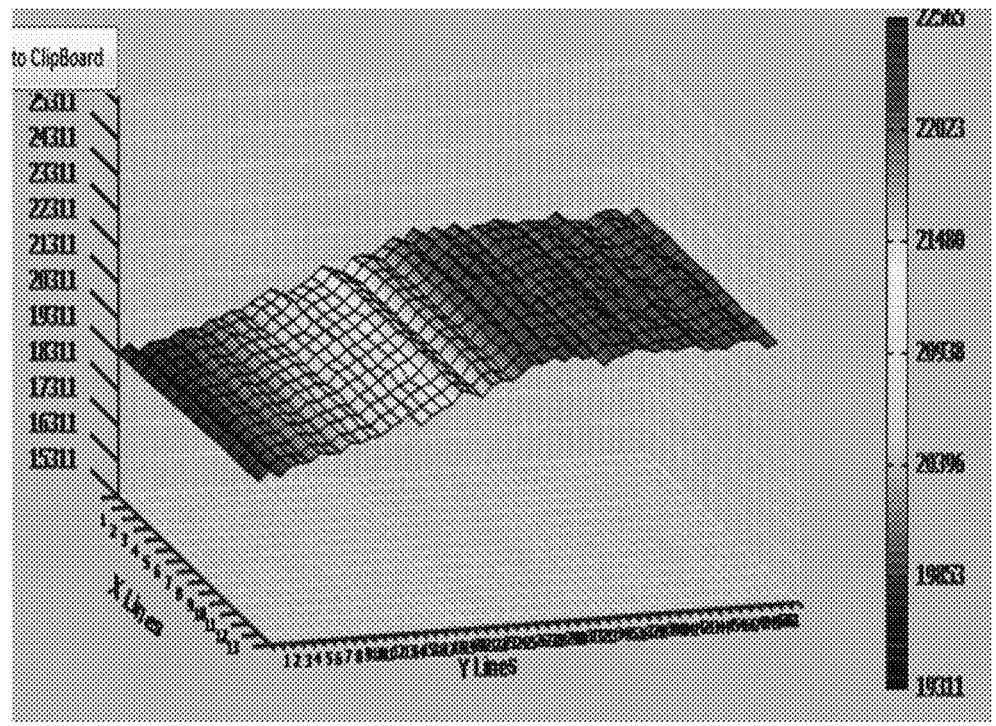
[Figure 12]
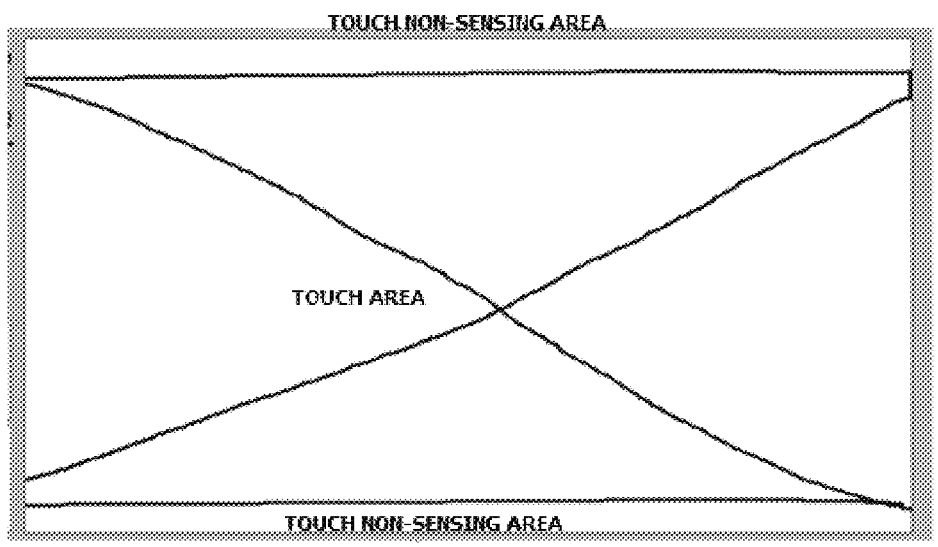

TOUCH SCREEN SENSOR

CROSS-REFERENCE TO RELATED APPLICATIONS

This application is a National Stage Application of International Application No. PCT/KR2016/015189 filed on Dec. 23, 2016, which claims priority to and the benefit of Korean Patent Application No. 10-2015-0185047 filed in the Korean Intellectual Property Office on Dec. 23, 2015, both of which are incorporated herein in their entirety by reference for all purposes as if fully set forth herein.

TECHNICAL FIELD

The present application relates to a touch screen sensor.

BACKGROUND ART

In general, a display device collectively refers to monitors for a TV or a computer as a whole, and includes a display device which forms an image and a case supporting the display device.

Examples of the display device may include a plasma display panel (PDP), a liquid crystal display (LCD), an organic light emitting diode (OLED), an electrophoretic display, and a cathode-ray tube (CRT). The display device may include an RGB pixel pattern for implementing an image and an additional optical filter.

The optical filter may include at least one of a reflection prevention film which prevents the external light that is incident from the outside from being reflected to the outside again, a near IR shield film which shields the near IR generated in the display device in order to prevent misoperation of electronic devices such as remote controllers, a color correction film which increases the color purity by controlling a color tone by including a color control dye, and an electromagnetic wave shield film for shielding the electromagnetic wave generated in a display device when a display apparatus is driven. Here, the electromagnetic wave shield film includes a transparent base substrate and a metal mesh pattern provided on the base substrate.

Meanwhile, with regard to the display apparatus, as the spread of IPTVs is accelerated, a demand for a touch function that uses hands as a direct input apparatus without a separate input apparatus such as remote controllers is growing. Further, a multi-touch function that is capable of recognizing a specific point and writing is also required.

The touch screen sensor which performs the aforementioned function may be classified into the following types according to a detection manner of the signal.

That is, there are a resistive type of sensing a position which is pressed down by pressure through a change in current or voltage value while a direct current voltage is applied thereto, a capacitive type of using a capacitance coupling while an alternating current voltage is applied thereto, an electromagnetic type of sensing a selected position by a change in voltage while a magnetic field is applied thereto, and the like.

Among them, the resistive type and capacitive type touch screen sensors that are most extensively utilized recognize the touch by a change in electric contact or capacitance by using the transparent conductive layer such as the ITO film. However, since the transparent conductive layer has the high resistance of 100 ohms/square or more, the sensitivity is lowered when the display device is manufactured in a large scale, and as the size of the screen is increased, the cost of the ITO film is rapidly increased, and accordingly, it is not easy to perform commercialization thereof. In order to overcome this, there is an effort to implement enlargement by using a metal pattern having high conductivity.

DETAILED DESCRIPTION OF THE INVENTION

Technical Problem

The present application is to provide a touch screen having a local touch function.

Technical Solution

An exemplary embodiment of the present application provides a touch screen sensor including a driving electrode unit which includes a driving electrode pattern (Tx pattern) provided on a first base substrate; and a sensitive electrode unit including a sensitive electrode pattern (Rx pattern) provided on a second base substrate, in which the driving electrode pattern and the sensitive electrode pattern include conductive metal lines and the touch screen sensor includes at least one touch non-sensing area and at least one touch sensing area.

Another exemplary embodiment of the present application provides an electronic device including the touch screen sensor and a display device provided below the touch screen sensor.

Advantageous Effects

According to an exemplary embodiment of the present application, it is possible to provide a touch screen sensor which touches a large area and also touches only a selected area and an electronic device including the same.

BRIEF DESCRIPTION OF DRAWINGS

FIG. 1 is a view schematically illustrating a touch non-sensing area and a touch sensing area of a touch screen sensor according to an exemplary embodiment of the present application.

FIG. 2 is a view schematically illustrating a Tx pattern of a touch screen sensor according to an exemplary embodiment of the present application.

FIGS. 3 and 4 are views schematically illustrating an Rx pattern and a first wiring electrode pattern of a touch screen sensor according to an exemplary embodiment of the present application.

FIGS. 5 and 6 are views schematically illustrating a wiring channel area and a disconnection area of a first wiring electrode pattern of a touch screen sensor according to an exemplary embodiment of the present application.

FIG. 7 is a view schematically illustrating a width of a disconnection area of a touch screen sensor according to an exemplary embodiment of the present application.

FIG. 8 is a view schematically illustrating a touch screen sensor according to an exemplary embodiment of the present application.

FIG. 9 is a view illustrating a resistance characteristic of an Rx pattern of a touch screen sensor according to an exemplary embodiment of the present application.

FIG. 10 is a view illustrating a resistance characteristic of a Tx pattern of a touch screen sensor according to an exemplary embodiment of the present application.

FIG. 11 is a view illustrating raw cap data of a touch sensing area of a touch screen sensor according to an exemplary embodiment of the present application.

FIG. 12 is a view illustrating a drawing test result of a touch sensing area of a touch screen sensor according to an exemplary embodiment of the present application.

EXPLANATION OF REFERENCE NUMERALS AND SYMBOLS

10: Touch non-sensing area
20: Touch sensing area
30: Disconnection area
40: Wiring channel area

BEST MODE

Hereinafter, the present application will be described in detail.

As a touch screen sensor of the related art, a product in which a driving electrode pattern (Tx pattern) serving to drive voltage and a sensing electrode pattern (Rx pattern) which receives a signal of a mutual cap therefor to transmit the signal to a circuit are spatially separated is mainly used. A part of designing and manufacturing the touch screen sensor by considering a layered structure and permittivity of a dielectric substance which is inserted therein to maximize a touch sensitivity and a capacitance value is accepted as a core technique. According to such a method, in general, a display area and a touch area are similarly matched to touch the entire area of the display.

However, recently, a display area and a touch area are divided to introduce a selected touch area as needed so that an application which applies the selected touch area is gradually increased. For example, in a situation where an application area of a touch for a vehicle is expanding by spreading electric vehicles recently, there is an attempt to combine a mechanical button located in a console area near a gear control lever located at a side of a driver seat with a display. Further, a design attempt has been also made to match a center information display with the display by removing the mechanical button in the corresponding area. However, when a display function and a touch function are assigned to the entire area, an erroneous touch operation is caused by a habit of a driver or other unexpected environments and an operation of a machine in accordance with the erroneous touch operation is caused. Therefore, it is requested to assign a touch function to a selected area and provide a solution thereof. Further, in the case of display, even though an OLED which freely changes and introduces a display according to a shape of a vehicle console area is recently getting the spotlight, there is a lack of a solution which can introduce only touch of a selected area while touching a large area in accordance with a change of a shape of the display.

As a touch screen sensor which is applicable to a large area and flexible, a metal mesh touch screen sensor is emerging as the strongest candidate through an industrial world and an academic world. However, design way and method which enable touch only to a selected area using such a metal mesh touch screen sensor have not been developed yet. Therefore, the present application suggests a solution for a method which enables touch only to a selected area using the metal mesh touch screen sensor.

First, a simplest method which enables the touch only to the selected area using the metal mesh touch screen sensor is a method which introduces a self-cap mode one-layer solution. However, since the self-cap mode one-layer solution has a disadvantage in that a touch resolution is not good and a hybrid touch by which touch is possible while wearing a glove cannot be achieved, the present application employs a mutual two-layer mode to overcome the disadvantage.

To this end, in the present application, firstly, definitions of a display area and a touch area as illustrated in FIG. 1 are preferentially identified. In the present specification, the display area refers to a touch non-sensing area and the touch area refers to a touch sensing area.

As seen from FIG. 1, when the display area and the touch area are differently set, if only the touch area is formed and implemented by the metal mesh, only the touch area is displayed to be dark due to a difference in uniformity of transmittance of the entire display. Therefore, in order to overcome the above-mentioned problem, the metal mesh needs to be introduced not only to the touch area, but also to the entire display area and it is important to design to operate the touch only in the touch area through a circuit configuration.

However, when it is implemented to operate the touch only in a specific area, due to the characteristic of the mutual two layer touch mode, there may be problems in that 1) a wiring electrode area serving as a wiring line needs to be introduced while touch is not operated in the touch non-sensing area and 2) a wiring line with a ground and a guard pattern for the above-mentioned hybrid touch needs to be formed over an outer peripheral area of the display so that there may be a problem of a wiring line length and a yield. Further, in order to overcome a cross talk due to the coupling of the electric field in a node area as much as possible to improve precision of the touch, there is a restriction in that in the case of the sensitive electrode pattern (Rx pattern), a pattern should not exist near the wiring electrode area of the driving electrode pattern (Tx pattern).

That is, in the case of other touch of the related art, various methods which may improve touch response speed and performance through double routing of the sensitive electrode pattern (Rx pattern) may be introduced. However, in this case, there is a problem in that when the pattern corresponding to the double routing is introduced to the touch non-sensing area, an electric field formed in an overlapping area of the introduced route pattern area and the driving electrode pattern (Tx pattern) therebelow or between proximate areas is recognized as a touch node, so that the corresponding area is recognized as a touch available area.

In order to solve the above-mentioned problems, in the present application, a design of a sensitive electrode pattern (Rx pattern) and a driving electrode pattern (Tx pattern) with the following shape is contrived and made.

A touch screen sensor according to an exemplary embodiment of the present application includes a driving electrode unit including a driving electrode pattern (Tx pattern) provided on a first base substrate and a sensitive electrode unit including a sensitive electrode pattern (Rx pattern) provided on a second base substrate, the driving electrode pattern and the sensitive electrode pattern include conductive metal lines, and the touch screen sensor includes at least one touch non-sensing area and at least one touch sensing area.

In the present application, the touch screen sensor further includes FPCB which electrically connects the driving electrode unit and the sensitive electrode unit with an external power source. The driving electrode pattern and the sensitive electrode pattern are provided in the entire areas of the touch non-sensing area and the touch sensing area, respectively. The driving electrode pattern and the sensitive electrode pattern provided in the touch sensing area are independently and electrically connected to the FPCB and the driving electrode pattern provided in the touch non-sensing area is not electrically connected to the FPCB.

In the present application, the sensitive electrode pattern and the driving electrode pattern provided in the touch non-sensing area may further independently include a disconnection area which disconnects the electrical connection in the pattern.

The sensitive electrode unit may further include a first wiring electrode pattern which connects the sensitive electrode pattern provided in the touch sensing area with the FPCB and the first wiring electrode pattern may be provided in the touch non-sensing area. In this case, at least a part of the sensitive electrode pattern provided in the touch non-sensing area may serve as the first wiring electrode pattern.

In the touch screen sensor according to an exemplary embodiment of the present application, as illustrated in FIG. 1, the touch sensing area may be provided between two touch non-sensing areas. The areas of the touch sensing area and the touch non-sensing area may be appropriately adjusted by a person skilled in the art according to a usage purpose. The touch non-sensing area of the touch screen sensor according to an exemplary embodiment of the present application has different purpose and different configuration from the dummy area of the touch screen sensor of the related art.

In the present application, the driving electrode patter, the first wiring electrode pattern, and the sensitive electrode pattern may independently include a polygonal mesh pattern.

The Tx pattern of the touch screen sensor according to one exemplary embodiment of the present application is schematically illustrated in FIG. 2.

Further, an Rx pattern and a first wiring electrode pattern of a touch screen sensor according to an exemplary embodiment of the present application are schematically illustrated in FIGS. 3 and 4.

As seen from FIG. 2, it is confirmed that an area (a yellow rhombus area) corresponding to a channel which receives a signal of the driving electrode pattern (Tx pattern) is designed to precisely match the touch area. It is further confirmed that a ground electrode serving as a reference electrode for an applied signal and a guard area serving as protection for mutual interference and external electrical interference of the signal are designed to be close to the touch area as much as possible for the purpose of yield and resistance issues due to the increase of channel as mentioned above. In contrast, as seen from FIGS. 3 and 4, it is confirmed that the Rx channel (blue rhombus area) and a route area (blue bar area) existing in the touch non-sensing area exist in a display screen unit and the route area is designed to have a larger area than the channel area. It is difficult to distinguish the route area located in the touch non-sensing area from a channel area in the screen unit in a touch chip's position so that when the corresponding area and the Tx channel area overlap or are proximate to each other, an erroneous touch area may be generated. Therefore, in the present application, in order to minimize the erroneous operation, an area where the Rx channel unit is formed is entirely covered with a guard area to which no signal is applied so that the erroneous operation may be minimized. Further, by assigning a difference between electrical resistances of the channel area of the sensitive electrode pattern (Rx pattern) and the route area, the corresponding area is artificially designed to have a large width in order to increase sensitivity of the Rx channel area and minimize a difference of resistances with the route area existing at an outer periphery of the display. Further, the ground areas (Tx ground: gray/Rx ground: black) of the Rx pattern and the Tx pattern are located in the screen unit so that a deviation of the entire resistances is minimized.

In the display having a local touch designed as described above, as a result, all the wiring line area corresponding to the screen unit is processed by a mesh and a solid pattern exists only in an area which does not correspond to the screen unit. Further, in the Rx pattern, no separate conjunction exists in the channel area and the wiring area located in the screen unit.

However, in the meshed wiring line through the metal mesh which is seen from the Rx pattern, there is a restriction in that a linear resistance of the wiring area needs to be linearly increased in accordance with the increase of each channel, so that deliberate consideration needs to be given to the design. It is more deliberate in accordance with angle rotation to avoid Moire due to the presence of the metal mesh on the display so that the present application proceeds with a design following a Rule as illustrated in FIGS. 5 to 7, in consideration of the above-description.

A wiring channel area and a disconnection area of a first wiring electrode pattern of a touch screen sensor according to an exemplary embodiment of the present application are schematically illustrated in FIGS. 5 and 6.

Further, a width of the disconnection area of the touch screen sensor according to one exemplary embodiment of the present application is schematically illustrated in FIG. 7.

In the present application, the first wiring electrode pattern alternately includes at least one wiring channel area which connects a sensitive electrode pattern provided in the touch sensing area and the FPCB to each other and at least one disconnection area where the electric connection in the pattern is disconnected. The width of the disconnection area is (a characteristic length $(L) \times 2^{1/2}$) or shorter and the characteristic length (L) is a 0.5-th power of an area of any one polygon which configures the mesh pattern.

Further, the width of the disconnection area is two times or more the disconnection distance and the disconnection distance may be a distance of the most adjacent ends of two or more conductive metal lines which are provided in the disconnection area and are spaced apart from each other.

As seen from FIGS. 4 and 5, when line widths of connection areas existing between disconnection areas are equal to each other, a route wiring line in the screen unit which is connected to each channel shows a resistance which has a linear relationship according to a channel number and a route length. However, when the disconnection area is designed to be a single disconnection, if an element which causes a short-circuit such as a foreign substance is inserted into the disconnection area, failure due to a short-circuit of the channel may be caused. In order to minimize the failure, dual disconnection is generally introduced. When dual disconnection is introduced, if two disconnections are proximate to each other, an appearance phenomenon due to the disconnection pattern overlapping may be caused. In order to minimize the phenomenon, it is advantageous to separate a distance between the disconnections as much as possible. However, when the distance of the disconnections is arbitrarily separated at the time of dual disconnection, floating electrodes which will be described below are connected to be long so that a signal is weakened at the time of applying an electric field.

It is illustrated in FIG. 6 that a directivity of the disconnection for forming a disconnection area of the first wiring electrode pattern is a straight line. Here, the directivity of the disconnection means a direction of lines displayed when adjacent disconnections are connected by a shortest distance. When the directivity of the disconnection is not a straight line, for example, is a zigzag line or a combination of a straight line and a zigzag line, a flowing direction of the current may be set to be similar to the case when the directivity of the disconnection is a straight line by appropriately designing a position of the disconnection.

Therefore, in order to overcome the above-mentioned problem, a minimum width of the disconnection area is desirably two times or more the disconnection distance and a maximum width of a disconnection which is directly adjacent to the disconnection does not exceed $2^{1/2}$ of the characteristic length. A shape of the touch screen sensor which is manufactured based on the design standard is schematically illustrated in FIG. 8.

Resistance characteristics of an Rx pattern and a Tx pattern of a touch sensing area are measured using a touch screen sensor of FIG. 8. More specifically, a resistance characteristic of an Rx pattern of a touch screen sensor according to an exemplary embodiment of the present application is illustrated in FIG. 9 and a resistance characteristic of a Tx pattern of the touch screen sensor according to an exemplary embodiment of the present application is illustrated in FIG. 10. Further, raw cap data of a touch sensing area of the touch screen sensor according to an exemplary embodiment of the present application is illustrated in FIG. 11 and a drawing test result of the touch sensing area of the touch screen sensor according to an exemplary embodiment of the present application is illustrated in FIG. 12. As seen from the above result, according to an exemplary embodiment of the present application, it is possible to provide a touch screen sensor which touches a large area and also introduces touch of only a selected area and an electronic device including the same.

In the present application, the disconnection area refers to an area where a part of an edge pattern of a polygon which configures the mesh pattern is disconnected to disconnect electrical connection. That is, the pattern of the disconnection area may include two or more metal lines which are spaced apart from each other in a length direction of a conductive metal line due to the disconnection. The disconnection distance may be 13 µm or smaller, 10 µm or smaller, or 7 µm or smaller, but is not limited thereto.

In the present application, the disconnection distance may refer to a distance between the closest ends of two or more conductive metal lines which are spaced apart from each other. The distance between the closest ends of two or more conductive metal lines which are spaced apart from each other refers to a distance between the most adjacent ends of two or more conductive metal lines which are spaced apart from each other.

In an exemplary embodiment of the present application, at least a part of the driving electrode pattern and the sensitive electrode pattern provided in the touch non-sensing area may include the disconnection area as described above to perform a function of the touch non-sensing area. In this case, the disconnection distance in the disconnection area may be 13 µm or smaller, 10 µm or smaller, or 7 µm or smaller, but is not limited thereto.

The touch screen sensor according to the present application recognizes the touch input using a mutual capacitance manner.

Further, in the present application, a difference of aperture ratios of the touch non-sensing area and the touch sensing area may be 10% or lower or 5% or lower and a difference of transmittances of the touch non-sensing area and the touch sensing area may be 10% or lower or 5% or lower, but these are not limited thereto.

In the present application, the aperture ratio may refer to a ratio of an area where the driving electrode pattern and the sensitive electrode pattern are not provided, with respect to an entire planar area of the touch screen sensor.

In the present application, as the polygonal mesh pattern, a pattern shape in the technical field may be used. The mesh pattern may include a regular polygonal pattern including one or more shapes of a triangle, a quadrangle, a pentagon, a hexagon, and an octagon.

Pitches of the driving electrode pattern, the first wiring electrode pattern, and the sensitive electrode pattern may be 600 µm or less and 250 µm or less, but the pitches may be adjusted according to transmittance and conductivity required by a person skilled in the art.

The driving electrode pattern, the first wiring electrode pattern, and the sensitive electrode pattern used in the present application are appropriately a material having specific resistance of $1\times10^6$ to $30\times10^6$ ohm·cm, and more desirably $7\times10^6$ ohm·cm or less.

In the present application, the conductive metal line may include one or more of gold, silver, aluminum, copper, neodymium, molybdenum, nickel, titanium, and an alloy thereof, but is not limited thereto. Herein, the thickness of the conductive metal line is not particularly limited, but is desirably 0.01 to 10 µm in terms of the conductivity of the conductive pattern and the economic efficiency of the forming process thereof.

In the present application, the line widths of the driving electrode pattern, the first wiring electrode pattern, and the sensitive electrode pattern may be independently 10 µm or less, 7 µm or less, 5 µm or less, 4 µm or less, or 2 µm or less, and 0.1 µm or more. To be more specific, the line widths of the driving electrode pattern, the first wiring electrode pattern, and the sensitive electrode pattern may be 0.1 to 1 µm, 1 to 2 µm, 2 to 4 µm, 4 to 5 µm, or 5 to 7 µm, but are not limited thereto.

The aperture ratios of the driving electrode pattern, the first wiring electrode pattern, and the sensitive electrode pattern, that is, the ratio of the area not covered by the pattern, may be independently 70% or more, 85% or more, and 95% or more. Further, the aperture ratios of the driving electrode pattern, the first wiring electrode pattern, and the sensitive electrode pattern may be 90 to 99.9%, independently, but are not limited thereto.

In the present application, a printing method is used to form the driving electrode pattern, the first wiring electrode pattern, and the sensitive electrode pattern, so that the driving electrode pattern, the first wiring electrode pattern, and the sensitive electrode pattern which have a small line width and are precise may be formed on a transparent base substrate. The printing method may be performed by using a method in which the paste or ink including a conductive pattern material is transferred on the transparent base substrate in the desired pattern form and then sintered. The printing method is not particularly limited, and a printing method such as offset printing, screen printing, gravure printing, flexo printing, inkjet printing, and nano imprint may be used, and one or more complex methods among the methods may be used. The printing method may adopt a roll to roll, roll to plate, plate to roll, or plate to plate method.

In the present application, it is desirable to apply a reverse offset printing method in order to implement the precise conductive pattern. To this end, in the present application, a method which coats ink that can be used as a resist during etching on an entire surface of a silicon-based rubber called a blanket, removes an unnecessary portion through an intaglio on which a pattern called a first cliché is formed, secondarily transfers a printing pattern remaining on the blanket on a base substrate such as a film or glass on which metal and the like are deposited, and then forms a desired pattern through sintering and etching processes may be performed. When this method is used, there is a merit in that resistance in a thickness direction can be uniformly maintained because uniformity of line heights is ensured over the entire region by using the base substrate on which metal is deposited. In addition to this, the present application may include a direct printing method which directly prints conductive ink such as Ag ink using the aforementioned reverse offset printing method and then sinters the conductive ink to form a desired pattern. In this case, the line heights of the pattern may be made uniform by printing pressure, and conductivity may be assigned by a heat sintering process, a microwave sintering process/a laser partial sintering process, or the like for the purpose of connecting Ag nanoparticles due to inter-surface fusion.

In the present application, the driving electrode pattern, the first wiring electrode pattern, and the sensitive electrode pattern may further include a darkening pattern provided in an area corresponding to the driving electrode pattern, the first wiring electrode pattern, and the sensitive electrode pattern, independently.

In the present application, the darkening pattern may be provided on an upper surface and/or lower surface of the driving electrode pattern, the first wiring electrode pattern, and the sensitive electrode pattern, or may be provided not only on the upper surface and the lower surface of the driving electrode pattern, the first wiring electrode pattern, and the sensitive electrode pattern, but also in at least part of a side surface, or provided on the upper surface, the lower surface, and the entire side surface of the driving electrode pattern, the first wiring electrode pattern, and the sensitive electrode pattern.

In the present application, the darkening pattern is provided on the entire surface of the driving electrode pattern, the first wiring electrode pattern, and the sensitive electrode pattern so that visibility due to the high reflectance of the driving electrode pattern, the first wiring electrode pattern, and the sensitive electrode pattern may be deteriorated. In this case, when the darkening pattern is coupled to a layer having the high reflectance such as the conductive layer, since the darkening layer has destructive interference and self-light absorbance under a specific thickness condition, there is exhibited an effect of reducing the reflectance by the driving electrode pattern, the first wiring electrode pattern, and the sensitive electrode pattern by similarly adjusting quantities of light reflected by the darkening pattern and light reflected by the driving electrode pattern, the first wiring electrode pattern, and the sensitive electrode pattern through the darkening pattern and guiding destructive interference between two lights under the specific thickness condition at the same time.

In this case, in the color range of the pattern region formed of the darkening pattern and the conductive pattern, which is measured from a surface from which the darkening pattern is visible, an L value may be 20 or less, an A value may be −10 to 10, and a B value may be −70 to 70, the L value may be 10 or less, the A value may be −5 to 5, and the B value may be 0 to 35, or the L value may be 5 or less, the A value may be −2 to 2, and the B value may be 0 to 15 based on a CIE LAB color coordinate.

Further, the total reflectance of a pattern region formed of the darkening pattern and the conductive pattern, which is measured from the surface from which the darkening pattern of the touch sensing area according to the present application is visible, may be 17% or less, 10% or less, or 5% or less based on external light of 550 nm.

Herein, the total reflectance means reflectance obtained in consideration of both diffuse reflectance and specular reflectance. The total reflectance is a value observed by setting the reflectance of an opposite surface of the surface to be measured in terms of reflectance by using a black paste, a tape or the like to 0 and then measuring only the reflectance of the surface to be measured, and in this case, a diffuse light source that is most similar to the ambient light condition is introduced as the provided light source. Further, in this case, the measurement position of the reflectance is set based on a position that is inclined at approximately 7° from a horizontal line of a hemisphere of an integrating sphere.

In the present application, the darkening layer and the conductive pattern may be patterned simultaneously or separately, but layers for forming each pattern are separately formed. However, it is most desirable to form the conductive pattern and the darkening pattern simultaneously in order to allow the conductive pattern and the darkening pattern to be present on the precisely corresponding surfaces.

By forming the pattern as described above, it is possible to implement a fine conductive pattern required in a touch screen sensor while optimizing and maximizing the effect of the darkening pattern. In the touch sensor, when the fine conductive pattern fails to be implemented, physical properties required for a touch sensor, such as resistance and the like may not be achieved.

In the present application, since the darkening pattern and the conductive pattern form a laminate structure by a separate pattern layer, the structure is different from a structure in which at least a portion of a light absorption material is recessed or dispersed in the conductive pattern, or a structure in which a portion of a surface is physically or chemically deformed by performing surface treatment on a conductive layer of a single layer.

Further, in the present application, the darkening pattern is directly provided on the base substrate or the conductive pattern without interposing an attachment layer or an adhesive layer therebetween. The attachment layer or adhesive layer may affect durability or optical properties. Further, a method for manufacturing the laminate structure included in the touch screen sensor according to the present application is totally different from the case in which the attachment layer or adhesive layer is used.

Moreover, as compared with the case in which the attachment layer or adhesive layer is used, in the present application, interface properties between the base substrate or the conductive pattern and the darkening pattern are excellent.

In the present application, any thickness may be used as long as the thickness of the darkening pattern satisfies the thickness condition of $\lambda/(4 \times n) = N$ (herein, N is an odd number) when the darkening pattern has destructive interference characteristics and absorption coefficient characteristics that are the aforementioned physical properties, the wavelength of light is $\lambda$, and the refractive index of the darkening layer is defined by n. However, during the manufacturing process, in consideration of an etching property with the conductive pattern, it is desirable that the thickness is selected from 10 nm to 400 nm, but the desirable thickness may be different according to the used material and manufacturing process, and the scope of the present application is not limited to the above numerical range.

The darkening pattern may be formed of a single layer, or a plurality of layers of two or more layers.

It is desirable that the darkening pattern has a color that is close to an achromatic color. However, the color is not necessarily an achromatic color, and may be introduced as long as the reflectance is low even though the darkening pattern has a color. In this case, the achromatic color means a color exhibited when light that is incident on a surface of a body is not selectively absorbed but evenly reflected and absorbed with respect to a wavelength of each component. In the present application, the darkening pattern may use a material having a standard deviation of total reflectance for each wavelength of 50% or less in a visible ray region (400 to 800 nm) when the total reflectance is measured.

The material of the darkening pattern is a light absorbing material, and preferably may be used without a particular limitation as long as the material is made of metal, metal oxide, metal nitride or metal oxynitride having the aforementioned physical properties when the entire surface layer is formed.

For example, the darkening pattern may be an oxide film, a nitride film, an oxynitride film, a carbide film, a metal film and a combination thereof formed by using Ni, Mo, Ti, Cr, and the like under a deposition condition set by the person skilled in the art.

As a specific example thereof, the darkening pattern may include both Ni and Mo. The darkening pattern may include 50 atom % to 98 atom % of Ni and 2 atom % to 50 atom % of Mo, and may further include 0.01 atom % to 10 atom % of other metals, for example, atoms such as Fe, Ta, and Ti. Herein, the darkening pattern, if necessary, may further include 0.01 to 30 atom % of nitrogen or 4 atom % or less of oxygen and carbon.

As another specific example thereof, the darkening pattern may include a dielectric material selected from SiO, $SiO_2$, $MgF_2$, and $SiN_x$ (x is an integer of 1 or larger) and a metal selected from Fe, Co, Ti, V, Al, Cu, Au, and Ag, and may further include an alloy of two or more kinds of metals selected from Fe, Co, Ti, V, Al, Cu, Au, and Ag. It is desirable that the dielectric material is distributed in an amount gradually decreased as external light goes away in an incident direction, and the metal and alloy component are distributed on the contrary. In this case, it is desirable that the content of the dielectric material is 20 to 50 wt % and the content of the metal is 50 to 80 wt %. When the darkening pattern further includes the alloy, it is desirable that the darkening pattern includes 10 to 30 wt % of the dielectric material, 50 to 80 wt % of the metal, and 5 to 40 wt % of the alloy.

As another detailed example thereof, the darkening pattern may be formed of a thin film including an alloy of nickel and vanadium, and one or more of oxide, nitride, and oxynitride of nickel and vanadium. In this case, it is desirable that vanadium is included in a content of 26 to 52 atom %, and it is desirable that an atomic ratio of vanadium to nickel is 26/74 to 52/48.

As another specific example thereof, the darkening pattern may include a transition layer in which two or more elements are included and a composition ratio of one element is increased by about maximum 20% per 100 angstrom according to an incident direction of external light. In this case, one element may be a metal element such as chrome, tungsten, tantalum, titanium, iron, nickel or molybdenum, and an element other than the metal element may be oxygen, nitrogen or carbon.

As still another specific example thereof, the darkening pattern may include a first chrome oxide layer, a metal layer, a second chrome oxide layer, and a chrome mirror, and in this case, may include metal selected from tungsten, vanadium, iron, chrome, molybdenum, and niobium instead of chrome. The metal layer may have a thickness of 10 to 30 nm, the first chrome oxide layer may have a thickness of 35 to 41 nm, and the second chrome oxide layer may have a thickness of 37 to 42 nm.

As another specific example thereof, a laminate structure of an alumina ($Al_2O_3$) layer, a chrome oxide ($Cr_2O_3$) layer and a chrome (Cr) layer may be used as the darkening pattern. Herein, the alumina layer has improvement of a reflection characteristic and a light diffusion prevention characteristic, and the chrome oxide layer may improve a contrast characteristic by decreasing inclined surface reflectance.

In the present application, the darkening pattern is provided in a region corresponding to the conductive pattern. Herein, the region corresponding to the conductive pattern means that the region has the pattern having the same shape as the conductive pattern. However, the pattern dimension of the darkening pattern does not need to be completely the same as that of the conductive pattern, and the case where the line width of the darkening pattern is narrow or wide compared to the line width of the conductive pattern is also encompassed in the scope of the present application. For example, it is desirable that the darkening pattern has an area of 80 to 120% of an area in which the conductive pattern is provided.

It is desirable that the darkening pattern has a pattern shape having the same line width as or larger line width than the conductive pattern.

When the darkening pattern has a pattern shape having a line width which is larger than the line width of the conductive pattern, the darkening pattern may more greatly impart an effect that the darkening pattern blocks the conductive pattern during the observation by a user, and thus there is an advantage in that the darkening pattern may efficiently block an effect caused by luster of the conductive pattern itself or reflection. However, even when the line width of the darkening pattern is the same as the line width of the conductive pattern, an effect to be targeted by the present application may be achieved.

Another exemplary embodiment of the present application provides an electronic device that includes the touch screen sensor and a display device provided below the touch screen sensor.

According to an exemplary embodiment of the present application, a touch screen sensor which touches a large area and also touches only a selected area and an electronic device including the same may be provided.

The invention claimed is:

1. A touch screen sensor, comprising:
   a driving electrode unit including a driving electrode pattern (Tx pattern) provided on a first base substrate;
   a sensitive electrode unit including a sensitive electrode pattern (Rx pattern) provided on a second base substrate;
   a guard area to which no signal is applied entirely covering an area where a channel that receives a signal of the Rx pattern (Rx channel unit) is formed; and
   a flexible printed circuit board (FPCB) which electrically connects the driving electrode unit and the sensitive electrode unit to an external power source,
   wherein the driving electrode pattern and the sensitive electrode pattern include conductive metal lines and the touch screen sensor includes at least one touch non-sensing area and at least one touch sensing area, and wherein the driving electrode pattern and the sensitive electrode pattern are provided in entire areas of the touch non-sensing area and the touch sensing area, respectively, the driving electrode pattern and the sensitive electrode pattern provided in the touch sensing area are electrically connected to the FPCB independently, and the driving electrode pattern which is provided in the touch non-sensing area is not electrically connected to the FPCB.

2. The touch screen sensor of claim 1, wherein the driving electrode pattern and the sensitive electrode pattern which are provided in the touch non-sensing area further independently include a disconnection area which disconnects electrical connection in the pattern.

3. The touch screen sensor of claim 1, wherein the sensitive electrode unit further includes a first wiring electrode pattern which connects the sensitive electrode pattern provided in the touch sensing area to the FPCB and the first wiring electrode pattern is provided in the touch non-sensing area.

4. The touch screen sensor of claim 3, wherein at least a part of the sensitive electrode pattern provided in the touch non-sensing area serves as the first wiring electrode pattern.

5. The touch screen sensor of claim 3, wherein the driving electrode pattern, the first wiring electrode pattern, and the sensitive electrode pattern independently include a polygonal mesh pattern.

6. The touch screen sensor of claim 5, wherein the first wiring electrode pattern alternately includes at least one wiring channel area which connects the sensitive electrode pattern provided in the touch sensing area and the FPCB to each other and at least one disconnection area where the electric connection in the pattern is disconnected, the width of the disconnection area is (a characteristic length (L)×$2^{1/2}$) or shorter and the characteristic length (L) is a 0.5-th power of an area of any one polygon which configures the mesh pattern.

7. The touch screen sensor of claim 6, wherein the width of the disconnection area is two times or more the disconnection distance and the disconnection distance is a distance of most adjacent ends of two or more conductive metal lines which are provided in the disconnection area and are spaced apart from each other.

8. The touch screen sensor of claim 1, wherein the conductive metal line includes one or more of gold, silver, aluminum, copper, neodymium, molybdenum, nickel, titanium, and an alloy thereof.

9. The touch screen sensor of claim 3, further comprising:
a darkening pattern on the driving electrode pattern, the first wiring electrode pattern, and the sensitive electrode pattern, independently.

10. The touch screen sensor of claim 1, wherein the touch screen sensor recognizes a touch input using a mutual capacitance manner.

11. The touch screen sensor of claim 1, wherein a difference in aperture ratios of the touch non-sensing area and the touch sensing area is 10% or lower.

12. The touch screen sensor of claim 1, wherein a difference in transmittances of the touch non-sensing area and the touch sensing area is 10% or lower.

13. An electronic device, comprising:
the touch screen sensor of claim 1; and
a display device provided below the touch screen sensor.

* * * * *